(12) United States Patent
Hofbauer

(10) Patent No.: US 8,701,620 B2
(45) Date of Patent: Apr. 22, 2014

(54) SEAL ASSEMBLY FOR AN INTERNAL COMBUSTION ENGINE

(75) Inventor: Peter Hofbauer, West Bloomfield, MI (US)

(73) Assignee: EcoMotors, International, Allen Park, MI (US)

( * ) Notice: Subject to any disclaimer, the term of this patent is extended or adjusted under 35 U.S.C. 154(b) by 0 days.

(21) Appl. No.: 13/513,593

(22) PCT Filed: Dec. 8, 2010

(86) PCT No.: PCT/US2010/059549
§ 371 (c)(1),
(2), (4) Date: Jun. 15, 2012

(87) PCT Pub. No.: WO2011/072063
PCT Pub. Date: Jun. 16, 2011

(65) Prior Publication Data
US 2013/0008406 A1 Jan. 10, 2013

Related U.S. Application Data

(60) Provisional application No. 61/267,853, filed on Dec. 9, 2009.

(51) Int. Cl.
*F02F 3/00* (2006.01)
*B23P 6/02* (2006.01)

(52) U.S. Cl.
USPC .................................. 123/193.6; 277/310

(58) Field of Classification Search
USPC ............ 123/193.6, 193.2; 277/310, 311, 467, 277/434, 436, 438, 439, 909, 910
See application file for complete search history.

(56) References Cited

U.S. PATENT DOCUMENTS

| | | | |
|---|---|---|---|
| 3,839,996 A | 10/1974 | Debiasse | |
| 4,206,930 A * | 6/1980 | Thrane et al. | 277/468 |
| 4,331,065 A * | 5/1982 | Fellberg | 92/158 |
| 4,432,313 A * | 2/1984 | Matlock | 123/193.6 |
| 4,695,064 A | 9/1987 | Brauers | |
| 5,695,199 A * | 12/1997 | Rao et al. | 277/455 |
| 5,788,246 A * | 8/1998 | Kuribayashi et al. | 277/463 |
| 6,615,788 B2 * | 9/2003 | Han | 123/193.6 |
| 6,675,762 B2 * | 1/2004 | Han | 123/193.6 |
| 6,959,930 B2 | 11/2005 | Wood et al. | |
| 7,396,018 B1 | 7/2008 | Fiedler | |
| 2006/0113730 A1 * | 6/2006 | Suzuki et al. | 277/434 |

* cited by examiner

*Primary Examiner* — Rinaldi Rada
*Assistant Examiner* — Hung Q Nguyen
(74) *Attorney, Agent, or Firm* — Diana D. Brehob

(57) ABSTRACT

An improved oil and gas seal assembly for an internal combustion engine that includes a scraper ring retained within an annular containment groove that, in several embodiments, is formed in the side wall of the cylinder and sized to allow the scraper ring to be fitted therein. The depth of the annular containment groove is sufficient to allow the scraper ring to be expanded during assembly with the piston and during engine operation when the assembly is exposed to vibration and heat variations. A resilient element surrounds the scraper ring within the annular containment groove in order to apply inward forces to the scraper ring and keep it in contact with the movable piston skirt side wall, and also in contact with at least one wall of the groove to prevent an alternative migration path for oil or combustion gases.

17 Claims, 4 Drawing Sheets

SEAL ASSEMBLY FOR AN INTERNAL COMBUSTION ENGINE

This application is the United States National Stage of International Application No. PCT/US2010/1059549, filed 8 Dec. 2010, and claims the benefit of priority to U.S. Provisional Application No. 61/267,853, filed on 9 Dec. 2009. The above-mentioned applications are hereby incorporated, in their entirety, by reference.

TECHNICAL FIELD

The embodiments described herein relate to the field of internal combustion engines having at least one reciprocating piston within a cylinder that has a running surface surrounding the piston, and more directly to providing an oil and gas sealing assembly between the piston and the running surface.

BACKGROUND ART

Many conventional internal combustion engines have been configured to provide lubricating oil that sprays the cylinder walls or piston liners over which the piston rings travel during the cycle of the engine.

In some 2-cycle engines, such as the 'Internal combustion engine with a single crankshaft and having opposed cylinders and opposed pistons' ('OPOC engine') described in U.S. Pat. No. 6,170,443 and incorporated herein by reference, lubricating crankcase oil is splashed or sprayed into the cylinder area below the piston rings to effect wetting of the cylinder liner surfaces. In such lubrication systems, piston rings pick up the lubricating oil as they pass over the wetted liner surfaces and carry it forward as the piston travels from bottom dead center ('BDC') towards top dead center ('TDC'). With each stroke, a small amount of oil is carried past the exhaust and inlet ports of the cylinder. By using a plurality of rings, acceptable gas sealing is accomplished to prevent high compression exhaust gases from migrating along the gap between the piston and the cylinder.

There is a need to improve the lubrication system as it applies to 2-cycle engines, since if the liner is too wet, the piston rings carry too much oil forward into the scavenging ports and into the combustion chamber. This results in loss of oil through the exhaust ports that can result in HC emissions. Also, the moving of oil past the intake ports causes some oil to be carried into the combustion chamber, which may alter the combustion process. Conversely, if not enough oil is transported to the piston rings, then excessive wear may result.

Also, it is desirable to reduce the number of upper rings within an engine and still allow efficient oil lubrication near the upper end of the piston throughout its travel, while preventing oil from migrating into the combustion chamber itself. It is further desirable to reduce the number of upper rings within an engine while preventing gas from leaking from the combustion chamber and into the oil sump. One such improvement is shown and described in U.S. Pat. No. 7,735,834, which is incorporated herein by reference. There, a non-moving oil/gas seal assembly is mounted in the cylinder wall immediately below the exhaust/intake port to ensure both gas and oil tightness. The seal assembly is in constant contact with the piston side wall throughout the piston's travel within the cylinder and utilizes a compression spring to maintain the sealing pressure of the ring against the piston side wall.

Another prior art stationary ring seal is shown in FIG. 1, wherein a one piece ring 120 is shown mounted within a ring containment groove 102 in a cylinder liner wall 101. A reciprocating piston 110 is shown having a side wall surface 111 that is mounted for reciprocating movement along an axis that is horizontal in the drawing.

For reference purposes in FIG. 1 (as well as all of the figures), the portion to the left of the oil scraper ring 120 is the 'lower' portion and the portion to the right of the oil scraper ring 120 is the 'upper' portion. These terms correspond to references made with respect to internal combustion engines where portions in the cylinder towards the combustion chamber are considered to be upper portions and those portions with reference to the combustion chamber and towards the oil sump are lower portions. Accordingly, when reference is made to locations that are 'above' or 'below' they are understood to be relative positional terms within the same directional concept.

An oil lubrication drain passage 108 is provided in the cylinder 101 to allow lubricating oil to drain from the lower portion of the cylinder side wall 106 below the seal assembly. Since a small gap exists between the side wall surface 111 of piston 110 and the side wall surface 106 of cylinder liner 101, scraper ring 120 has inwardly extending scraper blade surfaces 122 and 124 that are in contact with the piston side wall 111. The scraper blade surfaces 122 and 124 are formed in parallel rings of equal diameter. The blade surface 122 is the 'upper' blade because it is nearest the combustion chamber part of the cylinder from which gases G (see arrow) from the combustion chamber are present in the gap under pressure immediately after combustion. The circular upper blade surface 122 is continuous, except for the ring gap (not shown), to prevent gases G from migrating through the gap and into the lower part of the cylinder. The circular lower blade surface 124 is arcuate and discontinuous due to open gaps 125 that allow oil accumulated through the scraping process to be released below the seal. The scraper ring 120 has a single groove 126 formed on its outer circumference and a tension spring 130 is located within groove 126 to provide continuing pressure to scraper ring 120 and keep the scraper blade surfaces 122 and 124 in contact with piston side wall 111.

Technical Problem

A small tolerance is provided between the width of scraper ring 120 and the width of the ring containment groove 102 to allow the ring to have some flexibility of movement within the groove 102. Vibration and heat expansion result in the desire for the ring 120 to be able to move within the groove 102. Otherwise, binding or scoring could occur between the ring and the reciprocating piston that may result in increased engine wear or premature failure. As a result, small gaps are provided between the ring side walls 121 and 123 and the respective groove side walls 104 and 105. In this prior art assembly, when the piston 110 is moving towards its TDC position (from left to right in the drawing) the ring 126 is dragged within groove 102 to the right where its side wall 121 is tightly contacted against groove wall 104. However, this also opens up a small gap between side wall 123 and groove wall 105. This, in turn, provides an open space for oil to migrate into the groove, past the spring 130 and to collect within the groove cavity. When the piston returns towards its BDC position (from right to left), the ring 120 is moved slightly to the left and creates a small gap between side wall 121 and groove wall 104. When that occurs, combustion gases G can migrate into the groove 102 and mix with oil that is already trapped in the groove. By this back and forth action, the oil and gas within the groove 102 tend to migrate in both directions causing potentially adverse contamination in each direction.

Technical Solution

The solution to the problem lies keeping the seal ring(s) compressed against the running surface of the piston or the cylinder as well as the sides of the ring containment groove sufficiently to reduce the migration of oil and gas into the ring containment groove, while preventing binding of the seal ring(s) against the running surface.

Advantageous Effects

The result is a reduction in the migration of oil and gas into the ring containment groove, and therefore reducing migration of oil into the combustion chamber and migration of gas into the lubrication system.

BEST MODE

While the disclosed embodiments are applicable for several types of internal combustion engines, it is exemplified herein as being installed in a 2-cycle OPOC engine, such as that shown in my above-referenced patents. As such, the cylinders and pistons are illustrated to represent reciprocal piston movement along a horizontal plane.

Figure 1:
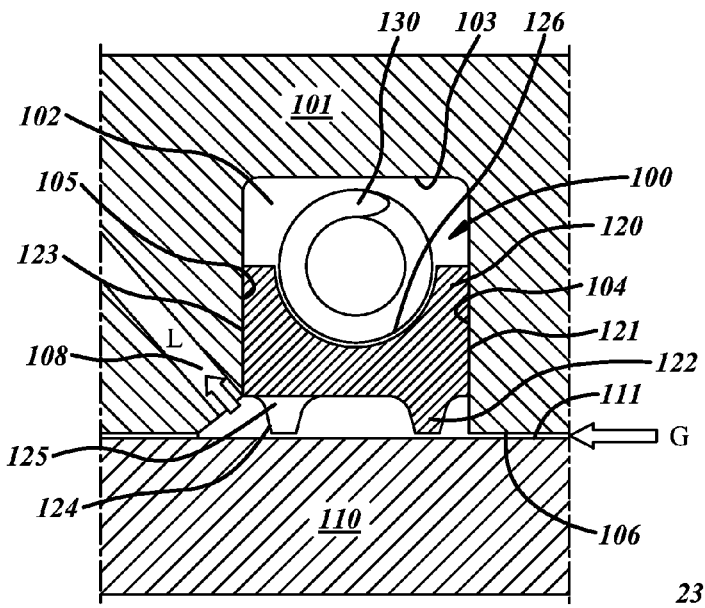
FIG. 1 is a cross-sectional view of a prior art air/gas/oil seal ring.
Figure 2:
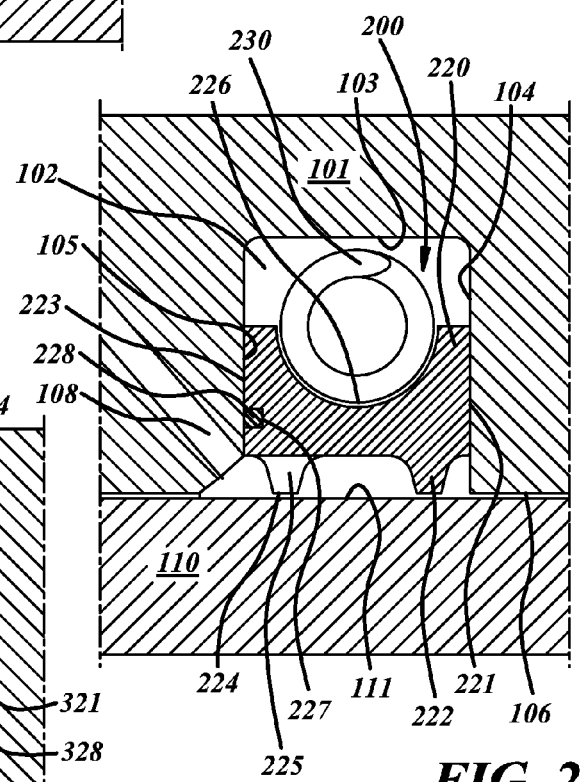
FIG. 2 is a cross-sectional view of a first air/gas/oil seal ring embodiment of the present invention.

FIG. 2 represents a first embodiment utilizing a ring assembly 200 located within ring containment groove 102. In this embodiment, a scraper ring 220 contains a continuous annular upper scraper blade 222 and a discontinuous annular lower scraper blade 224. An annular compression spring element 230 resides in an annular groove 226 on the outside of scraper ring 220 to provide scraper ring compression of upper and lower scraper blades against the running surface 111 of the piston 110. An elastomer O-ring 228 provided in an annular groove 227 created in the lower side wall 223 of scraper ring 220 provides additional sealing against groove side wall 105 that reduces the migration of lubricating oil from the lower portion below scraper ring 220 that would otherwise pass into ring containment groove 102 during piston movement towards its TDC position. Because O-ring 228 is formed of an elastomeric material, scraper ring 220 still retains the flexibility to move within the cavity formed by containment groove 102. However, the O-ring 228 prevents a gap from opening between side wall 221 on the upper side of scraper ring 220 and groove side wall 104 during engine operations when the piston 110 moves towards its BDC position. As a result, both lubricating oil from below scraper ring 220 and combustion gases from above scraper ring 220 are significantly restricted from entering containment groove 102. The former migration path around scraper ring 220, as described above with respect to FIG. 1, is blocked at all times by O-ring 228, which closes both potential gaps along the sidewalls 108 and 104 of containment groove 102 and substantially reduce the migration of lubricating oil and combustion gases above and below the ring assembly 200.

Figure 3:
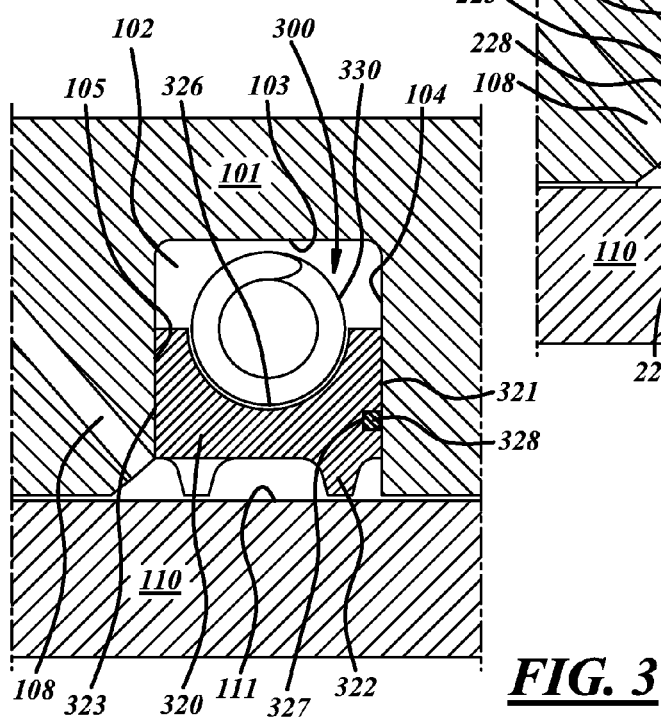
FIG. 3 is a cross-sectional view of a second air/gas/oil seal ring embodiment of the present invention.

FIG. 3 represents a second embodiment utilizing a ring assembly 300 located within ring containment groove 102. In this embodiment, a scraper ring 320 contains a continuous annular upper scraper blade 322 and a discontinuous annular lower scraper blade 324. An annular compression spring element 330 resides in an annular groove 326 on the outside of scraper ring 320 to provide scraper ring compression of upper and lower scraper blades against the running surface 111 of piston 110. An elastomer O-ring 328 provided in an annular groove 327 created in the upper side wall 321 of scraper ring 320 provides additional sealing against groove side wall 104 that reduces the migration of combustion gases from the upper portion above scraper ring 320 that would otherwise pass into ring containment groove 102 during piston movement towards its BDC position. Because O-ring 328 is formed of an elastomeric material, scraper ring 320 still retains the flexibility to move within the cavity formed by containment groove 102. However, the O-ring 328 prevents a gap from opening between side wall 323 on the lower side of scraper ring 320 and groove side wall 105 during engine operations when the piston moves towards its TDC position. As a result, both lubricating oil from below scraper ring 320 and combustion gases from above scraper ring 320 are significantly restricted from entering containment groove 102. The former migration path around scraper ring 320, as described above with respect to FIG. 1, is blocked at all times by O-ring 328, which closes both potential gaps along the sidewalls 108 and 104 of containment groove 102 and substantially reduce the migration of lubricating oil and combustion gases above and below the ring assembly 300.

Figure 4:
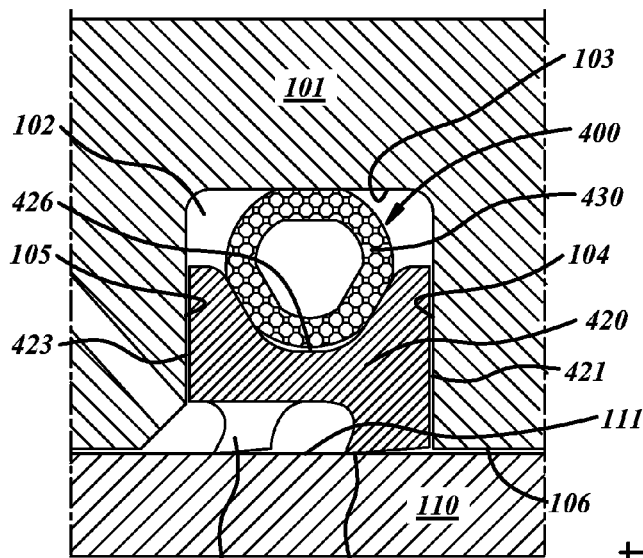
FIG. 4 is a cross-sectional view of a third air/gas/oil seal ring embodiment of the present invention.

FIG. 4 represents a third embodiment utilizing a ring assembly 400 located within ring containment groove 102. In this embodiment, a scraper ring 420 contains a continuous annular upper scraper blade 422 and a discontinuous annular lower scraper blade 424. An outer annular groove 426 is formed on the outer circumference of ring 420 and an elastomeric type toroidal hollow ring spring 430 is located within groove 426 to provide the compression forces for keeping the scraper blades in contact with the running surface 111. Elastomeric ring spring 430 has a smooth and flexible outer surface that contacts both the annular groove 426 of scraper ring 420 and the back wall 103 of ring containment groove 102. The surface of the elastomeric hollow ring spring 430 creates a seal with the groove surface 426 and with the back wall 103 of ring containment groove 102 when it is itself compressed between the groove surface 426 and the back wall 103. In this manner, even though a gap is created between the lower side surface 423 and lower groove wall 105 when the piston is moving towards its TDC position and small amounts of lubricating oil may enter the gap, substantially no migration of oil or gas is allowe past the elastomeric ring 430. Similarly, even though a gap is created between the upper side surface 421 and upper groove wall 104 when the piston is moving towards its BDC position and a small amount of combustion gasses may enter the gap, almost no migration of such gases is allowed past the elastomeric ring 430.

Figure 5:
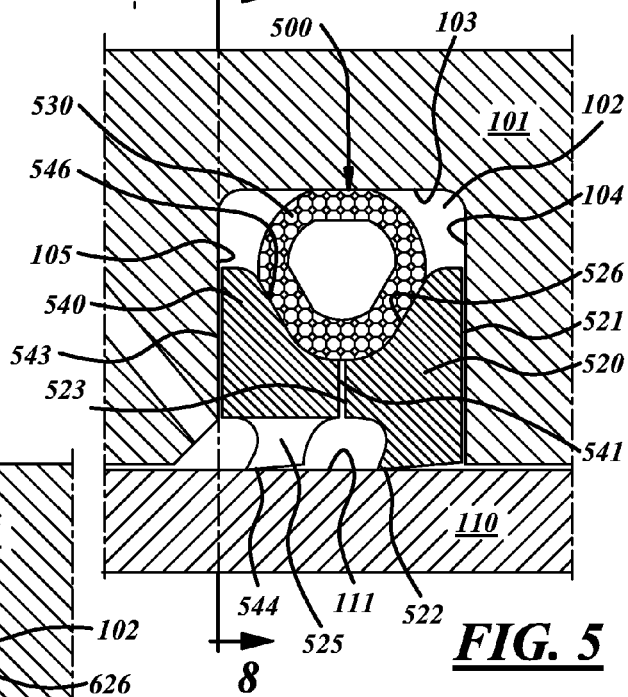
FIG. 5 is a cross-sectional view of a fourth air/gas/oil seal ring embodiment of the present invention.

FIG. 5 represents a fourth embodiment utilizing a ring assembly 500 located within ring containment groove 102. While this appears to be similar to the third embodiment shown in FIG. 4, it has additional features that provide enhanced sealing. In this embodiment, there are two scraper rings—an upper ring 520 and a lower ring 540. Upper ring 520 contains a continuous annular upper scraper blade 522 and lower ring 540 contains a discontinuous annular lower scraper blade 525. Upper ring 520 has a lower side wall 523 that sits in opposition to a corresponding upper side wall 541 of lower ring 540. The outer surface of the ring 520 has a curved annular surface 526 and the outer surface of the ring 540 has a curved annular surface 546. An elastomeric type toroidal hollow ring spring 530 sits between surfaces 526 and 546 and provides compression forces radially inward to force the scraper edges 522 and 544 against the running outer side wall surface 111 of piston 110. When installed in the containment groove 102, hollow ring spring 530 also exerts outward pressure that has vectors that force upper side wall 521 of upper ring 520 compressively against upper groove wall 104 and to force lower side wall 543 of lower ring 540 compressively against lower groove wall 105. As with the third embodiment, the elastomeric hollow ring spring 530 of this fourth embodiment is compressed against the back wall 103 of the cylinder groove 102. In this fourth embodiment, five seals are created within the cylinder groove 102 to substantially prevent migration of oil or gas past the ring assembly. Gaps are minimized between the rings and adjacent groove sidewalls because of the forces provided by the elastomeric hollow ring 530 (2 seals). The elastomeric hollow ring 530 makes sealing contact with three surfaces 103, 526 and 546 (3 seals).

Figure 6:
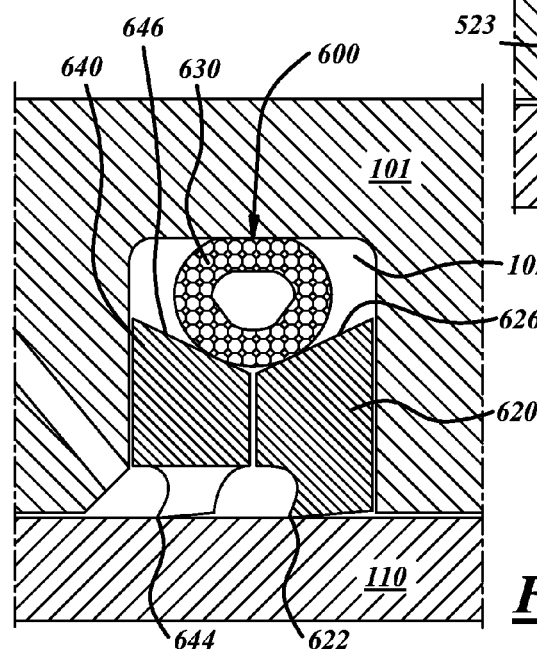
FIG. 6 is a cross-sectional view of a fifth air/gas/oil seal ring embodiment of the present invention.

FIG. 6 represents a fifth embodiment utilizing a ring assembly 600 located within ring containment groove 102. Similar to the fourth embodiment which utilizes two scraper rings 620 and 640, but differing in the size and thickness of the toroidal hollow ring spring 630. Also, the sloping surfaces 626 and 646 are oriented to provide a seat for the spring 630. As in the fourth embodiment, five seals are created within the cylinder groove 102 to prevent migration of oil or gas past the ring assembly.

Figure 7A:
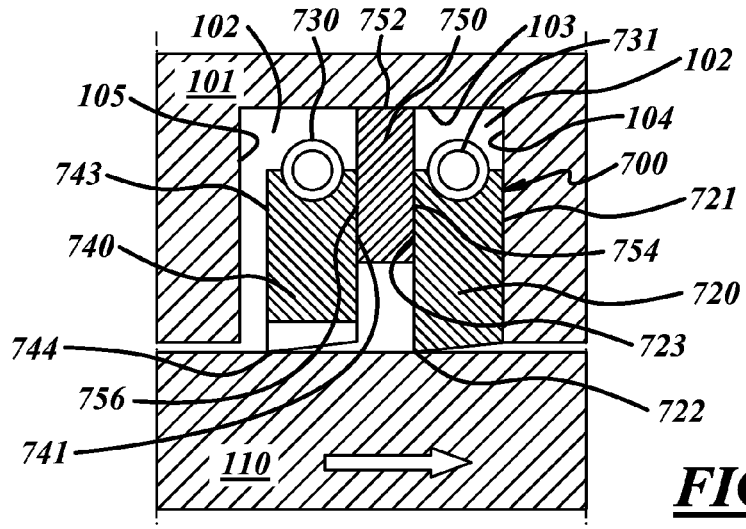
FIGS. 7A, 7B, and 7C are cross-sectional views of a sixth air/gas/oil seal ring embodiment of the present invention in three different stages of sealing.
Figure 7B:
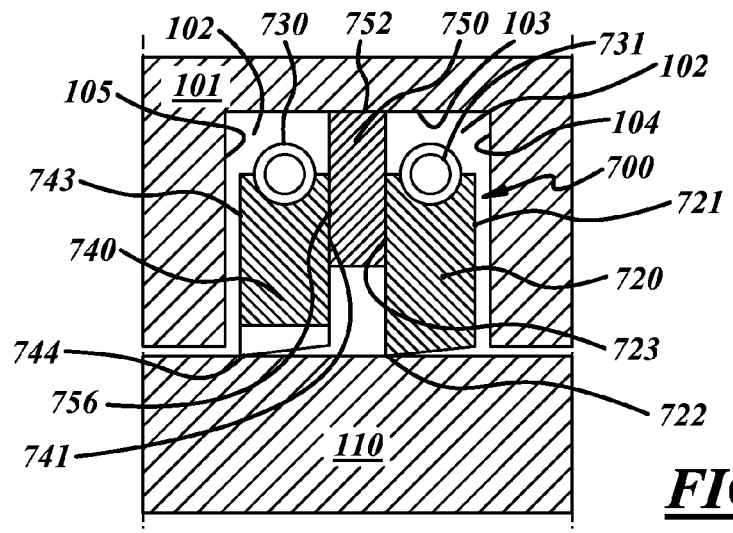
Figure 7C:
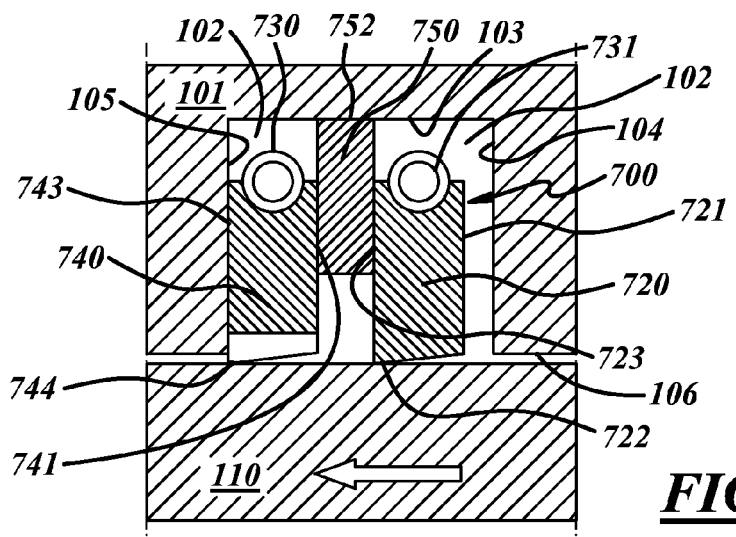

FIGS. 7A, 7B and 7C depict a sixth embodiment in separate states utilizing a ring assembly 700 located within ring containment groove 102. In FIG. 7A, the piston 110 is depicted as moving towards its TDC position to the right and therefore inducing drag forces against the ring seal assembly 700 within ring containment groove 102. In FIG. 7B, the seal assembly 700 is shown in a transition position in ring containment groove 102 between its two extreme locations. In FIG. 7C, the piston 110 is depicted as moving towards its BDC position to the left and therefore inducing drag forces against the ring seal assembly 700 within ring containment groove 102.

The sixth embodiment includes three rings in located in ring containment groove 102. An upper scraper ring 720 is held in compression against piston 110 by its own tension spring element 731. A lower scraper ring 740 is held in compression by its own tension spring element 730. A third center ring 750 is located between the upper and lower rings and is formed to be outwardly spring loaded so as to hold itself against the back wall 103 of groove 102. The effect of the sliding action of the piston 110, with respect to the ring assembly 700, is to force the ring assembly against a side wall of groove 102 and together the three rings 720, 740 and 750 provide a plurality of compressed surfaces which provide an enhanced seal against the migration of oil and/or gases.

In FIG. 7A, with the piston 110 advancing towards its TDC position, the three ring assembly 700 is forced to the upper side wall 104 of ring containment groove 102. The force is due to the friction between the scraper blades 722 and 744 and running surface 111 as they remove oil from the skirt side wall of piston 110. The upper side wall 721 of upper ring 720 abuts groove upper side wall 104. At all times the outer surface 152 of ring 150 is in compression contact with back wall 103 and slides along that surface in response to the changing travel directions of piston 110. Movement of the ring assembly 700 towards groove upper side wall 104 creates a slight gap between lower side wall 743 of lower ring 740 and groove lower side wall 105. However, there is no migration path allowed to occur past ring 740. Upper side wall 741 of ring 740 is held in compression against lower side wall 756 of center ring 750, and upper side wall 754 of center ring 750 is held in compression against lower side wall 723 of upper ring 720. As a result, all three potential passages for lubricating oil and combustion gasses between the upper ring 720 and lower ring 740 are continuously forcibly blocked.

FIG. 7B illustrates how the seal assembly 700 retains its tightly compressed configuration within containment groove 102 when the piston 110 changes direction after reaching either its TDC or BDC positions. Center ring 750 continues to exert pressure against back wall 103 of containment groove 102 and the upper and lower rings 720 and 740 are maintained in compression against center ring 750 by the movement of running surface 111.

In FIG. 7C, with the piston 110 advancing towards its BDC position, the three ring assembly 700 is forced to the lower side wall 105 of the ring containment groove 102. The force is due to the friction between the scraper blades 722 and 744 and running surface 111 as the scraper blades are dragged along the skirt side wall of piston 110 as they act to prevent combustion gases from migrating along the skirt side wall of piston 110. The lower side wall 743 of lower ring 740 abuts lower wall 105 of containment groove 102. At all times the outer surface 752 of ring 750 is in compression contact with back wall 103 and slides along that surface in response to the changing travel directions of the running surface 111 on piston 110. Of course, this movement of the ring assembly 700 to abut lower side wall 105, leaves a slight gap between upper side wall 721 of upper ring 720 and upper side wall 104 of containment groove 102. However, there is substantially no migration path allowed to occur past ring 720. Upper side wall 741 of lower ring 740 is held in compression against lower side wall 756 of center ring 750 and lower side wall 723 of upper ring 720 is held in compression against upper side wall 54 of center ring 750. All three potential passages between the upper ring 720 and lower ring 740 are continuously forcibly blocked by this embodiment.

Figure 8:
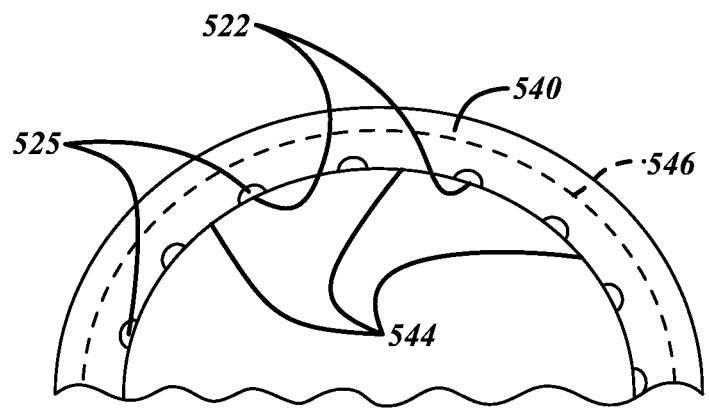
FIG. 8 is a plan view of half the air/gas/oil seal ring along the view lines 8-8 in FIG. 5.

FIG. 8 is provided to illustrate a half plan view of lower scraper ring 540 of FIG. 5 looking along lines 8-8. Circular groove 546 (shown in hidden lines) is formed in the outer surface of ring 540. Gaps 525 between scraper blades 544 are shown with the continuous scraper blade 522 of upper ring 520 in the background.

Figure 9:
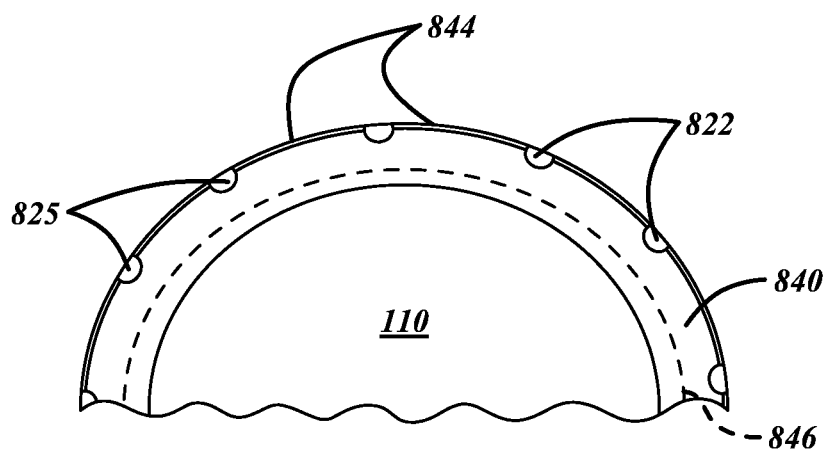
FIG. 9 is a plan view of half the air/gas/oil seal ring as configured for mounting in the side wall of a piston.

FIG. 9 illustrates the alternative and reverse configuration to the stationary embodiments described above. Here, a movable lower seal ring 840, of a seal assembly is shown which may be mounted on a reciprocating piston 110. In this configuration, groove 846 (shown in hidden lines) is formed in the inner surface of ring 840. Gaps 825 between scraper blades 844 are shown with the scraper blades 822 of an upper ring in the background. The same principles as discussed above for the stationary seal assembly can also be applied with a movable seal assembly mounted on a piston 110.

MODE FOR INVENTION

As can be seen by the drawings and accompanying explanation, embodiments of the present disclosure is a unique improvement over conventional engine lubrication ring sealing assemblies. And while the embodiments shown here are preferred, they shall not be considered to be a restriction on the scope of the disclosure.

Industrial Applicability

The embodiments are suitable for applicability in industries involved with the manufacture, modification and repair of internal combustion engines.

The invention claimed is:

1. A seal assembly for use in an internal combustion engine, comprising:
   a cylinder wall;
   a piston adapted to reciprocate within the cylinder wall;
   a ring containment groove formed in one of the cylinder wall and the piston, the ring containment groove having a back wall;
   at least one scraper ring disposed in the ring containment groove, the at least one scraper ring having: first and second planar side surfaces; a first arcuate blade opposite the back wall; and at least a second arcuate blade opposite the back wall; and
   an elastomeric member disposed between the back wall of the ring containment groove and the at least one scraper ring wherein when the ring containment groove is formed in the cylinder wall, the first and second arcuate blades are both in contact with the piston and when the ring containment groove is formed in the piston, the first and second arcuate blades are both in contact with the cylinder wall;
   wherein a surface of the at least one scraper ring proximate the back wall of the ring containment groove contacts the elastomeric member; and
   wherein the elastomeric member contacts the back wall of the ring containment groove.

2. The seal assembly of claim 1 wherein the elastomeric member is a hollow, substantially toroidal ring.

3. The seal assembly of claim 1 wherein the ring containment groove is formed in the cylinder wall and during reciprocation of the piston within the cylinder wall, tips of the arcuate blades ride on the piston.

4. The seal assembly of claim 1 wherein the ring containment groove is formed in the piston and during reciprocation of the piston with the cylinder wall, tips of the arcuate blades ride on the cylinder wall.

5. The seal assembly of claim 1 wherein the first arcuate blade is continuous and the second arcuate blade is discontinuous.

6. The seal assembly of claim 1 wherein the elastomeric member is hollow.

7. The seal assembly of claim 1, further comprising:
   an oil drain passage in fluidic communication with the ring containment groove.

8. The seal assembly of claim 1 wherein the side of the at least one scraper ring proximate the back wall of the ring containment groove forms a vee and the elastomeric member sits within the vee.

9. The seal assembly of claim 1 wherein the side of the at least one scraper ring proximate the back wall of the ring containment forms a depression and the elastomeric member sits within the depression.

10. A seal assembly for use in an internal combustion engine, comprising:
    a cylinder wall;
    a piston adapted to reciprocate within the cylinder wall;
    a ring containment groove formed in the cylinder wall, the ring containment groove having a back wall and two side walls;
    at least one scraper ring disposed in the ring containment groove, the at least one scraper ring having two side walls, a back wall having a depression, and first and second arcuate blades wherein tips of the first and second arcuate blades simultaneously contact the piston with a concave portion between the two arcuate blades; and
    an elastomeric member disposed in the depression and in contact with the back wall of the ring containment groove.

11. The seal assembly of claim 10 wherein the elastomeric member is hollow.

12. The seal assembly of claim 10 wherein the first arcuate blade is continuous and the second arcuate blade has a plurality of discontinuities.

13. The seal assembly of claim 12 wherein the plurality of discontinuities are provided to allow oil to pass therethrough.

14. A seal assembly for use in an internal combustion engine, comprising:
    a cylinder wall;
    a piston adapted to reciprocate within the cylinder wall;
    a ring containment groove formed in the piston, the ring containment groove having a back wall and two side walls;
    at least one scraper ring disposed in the ring containment groove, the at least one scraper ring having two side walls, a back wall having a depression, and first and second arcuate blades wherein tips of the first and second arcuate blades simultaneously contact the cylinder wall; and
    an elastomeric member disposed in the depression and in contact with the back wall of the ring containment groove.

15. The seal assembly of claim 14 wherein the elastomeric member is hollow.

16. The seal assembly of claim 14 wherein the first arcuate blade is continuous and the second arcuate blade has a plurality of discontinuities.

17. The seal assembly of claim 16 wherein the plurality of discontinuities are provided to allow oil to pass therethrough.

* * * * *